(12) United States Patent
Blumberg et al.

(10) Patent No.: US 7,599,795 B1
(45) Date of Patent: Oct. 6, 2009

(54) MOBILE LOCATION AWARE SEARCH ENGINE AND METHOD OF PROVIDING CONTENT FOR SAME

(75) Inventors: Brad W. Blumberg, Voorhees, NJ (US); Eric M. Blumberg, Ventnor, NJ (US)

(73) Assignee: Smarter Agent, LLC, Camden, NJ (US)

( * ) Notice: Subject to any disclaimer, the term of this patent is extended or adjusted under 35 U.S.C. 154(b) by 445 days.

(21) Appl. No.: 11/249,733

(22) Filed: Oct. 14, 2005

Related U.S. Application Data

(63) Continuation-in-part of application No. 09/639,265, filed on Aug. 15, 2000, now Pat. No. 6,385,541, application No. 11/249,733, which is a continuation-in-part of application No. 10/644,040, filed on Aug. 20, 2003, now Pat. No. 6,950,326, which is a continuation-in-part of application No. 09/774,119, filed on Jan. 31, 2001, now Pat. No. 7,072,665, which is a continuation-in-part of application No. 09/639,265, filed on Aug. 15, 2000, now Pat. No. 6,385,541, application No. 11/249,733, which is a continuation-in-part of application No. 09/774,119, filed on Jan. 31, 2001, now Pat. No. 7,072,665.

(60) Provisional application No. 60/618,748, filed on Oct. 15, 2004, provisional application No. 60/404,776, filed on Aug. 21, 2002, provisional application No. 60/186,155, filed on Feb. 29, 2000.

(51) Int. Cl.
*G01C 21/00* (2006.01)

(52) U.S. Cl. .................. 701/213; 701/208; 701/207; 701/214

(58) Field of Classification Search .......... 701/200–202, 701/213–215, 207–208, 24; 340/988, 995.1; 342/357.06, 357.12, 357.09, 357.13

See application file for complete search history.

(56) References Cited

U.S. PATENT DOCUMENTS 5,032,989 A    7/1991  Tornetta (Continued)

FOREIGN PATENT DOCUMENTS

GB    2357167    6/2001

(Continued)

OTHER PUBLICATIONS

"SnapTrack Awarded Patent For Locating or Tracking Wireless Devices Via Internet and Client-Server-Based Computer Networks",http://famulus.msnbc.com/famuluscom/businesswire01-23-050325.asp?sym=QCOM, Jan. 23, 2001.

(Continued)

*Primary Examiner*—Yonel Beaulieu
(74) *Attorney, Agent, or Firm*—Cooley Godward Kronish LLP

(57) ABSTRACT

A method includes identifying a geographic position of a wireless device. Data input by a user while the user is located at the geographic position of the wireless device is received. The data is associated with a landmark at the geographic position. The data is provided to a database based on the geographic position. A wireless device includes a transmitter configured to transmit a geographic position of the wireless device to a database. A receiver is configured to receive data input by a user of the wireless device while the user is located at the geographic position of the wireless device. The data is associated with a landmark at the geographic position of the wireless device. The receiver is configured to automatically receive information associated with the landmark from the database.

22 Claims, 2 Drawing Sheets

U.S. PATENT DOCUMENTS

| | | | |
|---|---|---|---|
| 5,058,009 | A | 10/1991 | Yoshino et al. |
| 5,594,425 | A | 1/1997 | Ladner et al. |
| 5,684,859 | A | 11/1997 | Chanroo et al. |
| 5,794,216 | A | 8/1998 | Brown |
| 5,831,664 | A | 11/1998 | Wharton et al. |
| 5,850,433 | A | 12/1998 | Rondeau |
| 5,852,810 | A | 12/1998 | Sotiroff et al. |
| 5,901,214 | A | 5/1999 | Shaffer et al. |
| 5,930,699 | A | 7/1999 | Bhatia |
| 5,938,721 | A | 8/1999 | Dussell et al. |
| 5,944,769 | A | 8/1999 | Musk et al. |
| 5,970,478 | A | 10/1999 | Walker et al. |
| 6,009,413 | A | 12/1999 | Webber et al. |
| 6,014,645 | A | 1/2000 | Cunningham |
| 6,115,611 | A | 9/2000 | Kimoto et al. |
| 6,122,520 | A | 9/2000 | Want et al. |
| 6,202,023 | B1 | 3/2001 | Hancock et al. |
| 6,343,317 | B1 | 1/2002 | Glorikian |
| 6,385,541 | B1 | 5/2002 | Blumberg et al. |
| 6,456,852 | B2 | 9/2002 | Bar et al. |
| 6,460,036 | B1 | 10/2002 | Herz |
| 6,496,776 | B1 | 12/2002 | Blumberg et al. |
| 6,542,812 | B1 * | 4/2003 | Obradovich et al. ........ 701/207 |
| 6,564,143 | B1 | 5/2003 | Alewine et al. |
| 6,594,633 | B1 | 7/2003 | Broerman |
| 6,625,457 | B1 | 9/2003 | Raith |
| 6,650,902 | B1 | 11/2003 | Richton |
| 6,973,432 | B1 | 12/2005 | Woodard et al. |
| 2002/0035609 | A1 | 3/2002 | Lessard et al. |
| 2002/0052814 | A1 | 5/2002 | Ketterer |
| 2002/0069148 | A1 | 6/2002 | Mutschler et al. |
| 2002/0077966 | A1 | 6/2002 | Harycki et al. |
| 2002/0111890 | A1 | 8/2002 | Sloan et al. |
| 2003/0014402 | A1 | 1/2003 | Sealand et al. |
| 2003/0069029 | A1 | 4/2003 | Dowling et al. |
| 2003/0092450 | A1 | 5/2003 | Juppi et al. |
| 2004/0139049 | A1 | 7/2004 | Hancock et al. |
| 2006/0006990 | A1 | 1/2006 | Obradovich |
| 2007/0069923 | A1 * | 3/2007 | Mendelson ................ 340/988 |

FOREIGN PATENT DOCUMENTS

| | | |
|---|---|---|
| JP | 7-65070 | 3/1995 |

OTHER PUBLICATIONS

"Lucent Technologies and Profilium Inc. Announce Alliance Agreement to Deploy Advanced Location-Based Mobile Advertising Solution", http://www.hoovershbn.hoovers.com/bin/story?StoryId=CoM0p0bKbytiXmdi&FQ=c....%2OL Jan. 23, 2001.

"The Meaning of Telematics", http://www.globaltelematics.com/telematics.htm, Oct. 30, 2000.

HomeFinder—Find the Home That's Right for You from http://www.homefinder.com, no date.

Printout from http://www.homescape.com/buying/, no date.

zipRealty.com: The zipRealty.com Buyer's Advantage from http://www.ziprealty.com/buy_a_home/advantage.jsp., no date.

Homes for Sale—MSN HomeAdvisor from http://homeadvisor.msn.com/homes/overview.asp, no date.

REALTOR.com: Real Estate—Find a new home and a realtor from http://www.realtor.com/FindHome/default.asp no date.

REALTOR.com: Real Estate—Homes for Sale in New Jersey from http://www.realtor.com/newjersey/nbselnjasp, no date.

REALTOR.com: Real Estate—Homes for Sale in Atlantic City from http://www.realtor.com/atlanticcity/nbregion4.asp, no date.

REALTOR.com: Find a Home—Select Property Type from http://www.realtor.com/PropType.asp?pgnum=1&st=nj&frm=bycomm&mls=atlanticcity&mlsttl=Atlantic+City&comm, no date.

REALTOR.com: Real Estate in Bay Area from http://www.realtor.com/selectnb.asp?frm=bycomm&st=nj&mls=atlanticcity&mlsttl=Atlantic+City&comm=Bay+Area&, no date.

REALTOR.com: Real Estate—Find a Neighborhood from http://www.realtor.com/FindNeig/default.asp, no date.

* cited by examiner

MOBILE LOCATION AWARE SEARCH ENGINE AND METHOD OF PROVIDING CONTENT FOR SAME

CROSS-REFERENCE TO RELATED APPLICATIONS

This application claims priority under 35 U.S.C. 119(e) to U.S. Provisional Application Ser. No. 60/618,748 entitled "Mobile Location-Aware Searching Engine and Method of Providing Content for Same," filed on Oct. 15, 2004, which is incorporated by reference in its entirety.

This application is a continuation-in-part of U.S. patent application Ser. No. 09/639,265 filed Aug. 15, 2000 now U.S. Pat. No. 6,385,541 entitled "Global Positioning-Based Real Estate Database Access Device and Method," which claims priority to U.S. Provisional Application Ser. No. 60/186,155 filed Feb. 29, 2000. This application is also a continuation-in-part of U.S. patent application Ser. No. 10/644,040 entitled "System and Method for Providing Information Based On Geographic Position," filed Aug. 20, 2003 now U.S. Pat. No. 6,950,326, which claims priority under 35 U.S.C. 119(e) to U.S. Provisional Application Ser. No. 60/404,776 entitled "System and Method for Providing Position Information," filed on Aug. 21, 2002, and which is a continuation-in-part of U.S. patent application Ser. No. 09/774,119 entitled "Position-Based Information Access Device and Method of Searching," filed on Jan. 31, 2001 now U.S. Pat. No. 7,072,665, which is a continuation-in-part of U.S. patent application Ser. No. 09/639,265 entitled "Global Positioning-Based Real Estate Database Access Device and Method," filed on Aug. 15, 2000 now U.S. Pat. No. 6,385,541, which claims priority under 35 U.S.C. 119(e) to U.S. Provisional Application Ser. No. 60/186,155 entitled "Global Positioning-Based Real Estate Database Access Device and Method," filed on Feb. 29, 2000. Each of the above applications are hereby incorporated by reference in their entirety. This application is also a continuation-in-part of U.S. patent application Ser. No. 09/774,119 entitled "Position-Based Information Access device and Method of searching," filed Jan. 31, 2001 now U.S. Pat. No. 7,072,665, which claims priority under 35 U.S.C. 120 to U.S. patent application Ser. No. 09/639,265, filed Aug. 15, 2000 and entitled "Global Positioning-Based Real Estate Database Access Device and Method," which claims priority under 35 U.S.C. 119(e) to U.S. Provisional Application Ser. No. 60/186,155 entitled "Global Positioning-Based Real Estate Database Access Device and Method," filed on Feb. 29, 2000, the disclosure of which is hereby incorporated by reference in its entirety.

BACKGROUND

The present invention relates to a device for accessing an information database, and, more particularly, to a device and system that uses an information database to access information about a landmark that is located at a geographic position where the device is located.

People often desire to obtain information about a particular location at which they are located, whether it be a famous or historic landmark, an office building, a business location, a piece of real estate, an airport, a hotel, shopping mall, a sports arena, a tropical rain forest, a redwood forest, a mountain range, a river, a single island or a string of islands, a war zone, or a hostage area. The traditional methods of obtaining such information include using printed materials such as guide books, maps, etc., communicating with people knowledgeable about the particular location, and researching the particular location either before or after being physically present at the location.

Such methods of obtaining information may significantly detract from the person's ability to appreciate or experience the location at which they are present. Put more simply, the person may not be able to gather or access enough information about the location because it is not readily available. Additionally, the person may not be able to access information about the location that is based on time. For example, if a person is visiting a famous landmark at a time when there are no tour guides available and the local gift shop is closed, the person may not be able to obtain valuable information about the landmark. While tour guides typically are associated with famous landmarks, landmarks as used in this context may be a famous or non-famous landmark, including, but not limited to the following types of landmarks: a historic area, an amusement park, a house, a restaurant, a store, etc. Although the person may be able to get location-centric information later, that isn't always a suitable alternative. Even in the event where a person is able to obtain printed materials, they are often cumbersome to carry around and read through while traveling from place to place. Moreover, as a person visits numerous locations, they tend to accumulate vast amounts of printed materials.

Another example in which location-specific, or time sensitive information is not readily obtained is during a real estate search. The traditional method of buying real estate requires the prospective purchaser to transact through a real estate broker for virtually every aspect of the transaction, from finding a desired property to completing the sale. Often the most difficult part of the process, from the buyer's perspective, is locating a desired piece of real estate. There are generally two methods employed to locate a desired piece of property.

The first method relies solely on the real estate broker to use his or her contacts, including listing services, to locate property that meets the buyer's specifications. The second is more random, in that if a buyer happens to pass a piece of property that is displaying a "for sale" sign, the buyer can write down the phone number shown on the sign to later inquire about the property, which then places the transaction totally within the broker's hands, as the broker controls all the information relating to the property (e.g., size and cost).

People are also often interested in gaining information about what a particular business has to offer. For example, when a person is located near a particular business they may want to know more information about the business. For example, a person may want to know such things as, what types of items a store offers, what specials or sales are occurring at a store, what type of food or menu items a restaurant offers, just to name a few. In addition, after visiting a particular business or landmark a person may want to share information about their experience. For example, a person may want to provide a review of a restaurant or store so that others can be better informed when they visit that business.

There are systems that relate to an address retrieval system based on the position of a cellular telephone. A cell phone user can request information relating to businesses that are located in the proximity of the user, based upon the geographic position of the user as determined by pinpointing the location of the cell phone. Once the location of the user is determined, a database that is keyed on geographic location is searched, looking for businesses of the type requested by the user (e.g., restaurants, gas stations, hotels, etc.) that are located in the area around the user. The system disclosed in the '699 patent may inform a user about a location of a restaurant (or other service location), but does not give the user real-time information pertaining to table availability, hours of operation, current specials.

Other systems include a mobile computer system having a built-in global positioning system (GPS) locator and an associated database that displays relevant information to the user based upon the user's current location. The database is accessed in real time as the user's position changes and is primarily focused on task-based information. For example, if a stored task is to buy milk, as the user approaches the grocery store, he or she is reminded to buy milk.

Thus, a need exists for a system and method of obtaining information about a landmark located near a user's current location, and for receiving information about the landmark from a user while the user is located near the landmark.

SUMMARY OF THE INVENTION

A method includes identifying a geographic position of a wireless device. Data is input by a user while the user is located at the geographic position of the wireless device is received. The data is associated with a landmark at the geographic position. The data is provided to a database based on the geographic position. A wireless device includes a transmitter configured to transmit a geographic position of the wireless device to a database. A receiver is configured to receive data input by a user of the wireless device while the user is located at the geographic position of the wireless device. The data is associated with a landmark at the geographic position of the wireless device. The receiver is configured to automatically receive information associated with the landmark from the database.

BRIEF DESCRIPTION OF THE DRAWINGS

The present invention is described with reference to the accompanying drawings.

DETAILED DESCRIPTION

Figure 1:
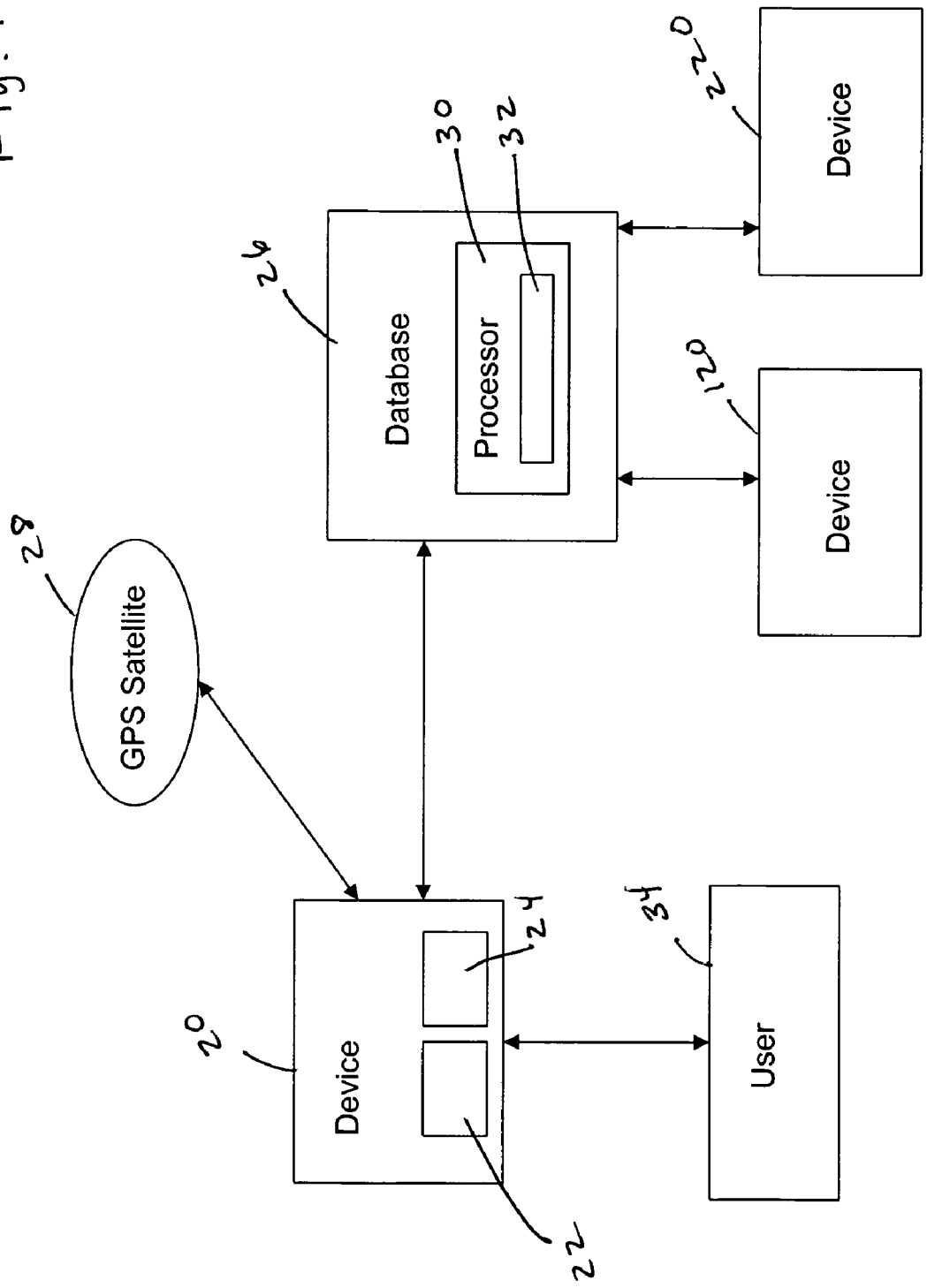
FIG. 1 is a schematic illustration of a system according to an embodiment of the invention.

A method includes identifying a geographic position of a wireless device. Data is input by a user while the user is located at the geographic position of the wireless device. The data input by the user is associated with a landmark at the geographic position. The data is provided to a database based on the geographic position. A wireless device includes a transmitter configured to transmit a geographic position of the wireless device to a database. A receiver is configured to receive data input by a user of the wireless device while the user is located at the geographic position of the wireless device. The data is associated with a landmark at the geographic position of the wireless device. The receiver is further configured to automatically receive information associated with the landmark from the database.

A system includes a location aware search engine that identifies a user's geographic location and then delivers information associated with a landmark at that location to the user.

The system can work with global positioning satellite (GPS) technology, or other location technologies such as triangulation or WiMAX. The system includes a map, code, and a load process where information associated with any property and geographic location in the United States (as well as other global locations and properties) can be added into a database. The system can provide information about a property or landmark, such as the uses/functions contained within the property. For example, the system can provide information about retailers or cultural institutions that inhabit a particular property space or landmark and what special items they may have to offer.

A landmark as used herein can include any type of property such as a building, a house, a stadium, a park, etc., and can include a business establishment or non-business establishment, such as an individual home.

A mobile or wireless device can be used to access a database to search for information, promotions, and events at landmarks relative to where the user is physically located. The system requires limited typing as the system uses location-detecting technology, such as through an operative communication with a GPS satellite, to identify where the user is standing. The system provides for the user to be able to input information associated with a landmark while the user is located at the geographic location of that landmark.

Location-based services (LBS), such as the system described herein, can help link the virtual world of the Internet with the physical world in which people live. Through the use of mobile devices, a user can access a corresponding region of cyberspace related to where they are physically located. In this manner, the system links the user to a vault of information based on where the user is located.

With the system of the invention, businesses and organizations can satisfy specific consumer needs at specific moments and locations. For example, instead of just looking along the street on which the user is walking at what is visible, the system makes it possible for a user to obtain information about a particular property or business automatically when the user is located at that property or business. Such information can include, for example, interesting events, special sales on gifts, and fashions available at retail stores. The system also provides information related to educational activities, poetry readings, wine tasting, and last minute tickets to a play. Other examples include information related to historical sites and buildings, and information about a specific building, such as when it was built, what it was used for 100 years ago, who the architect was, etc. The system can also provide selected literature or passages, such as a passage from the Declaration of Independence.

Information about restaurants and bars or other establishments can also be provided. The system can provide a 24/7 self-guided information source for locating the best restaurants and bars in the user's vicinity. Thus, data can be provided through a number of different sources that can be uploaded to the system.

In one embodiment, the system can be organized into categories. For example, information can be grouped into categories based on the type of information, or type of business. The categories can also be further divided into sub-categories. In some embodiments, the system can be used to provide information about a particular property, such as who did the landscaping, or other contractor service. A sign-maker, for example, can input into the system the location of his best work(s).

As another example, landlords can input information about apartments available for rent. For example, when a user is located outside a particular apartment building, the user can access the system to find out if there is any availability. A user can also access the system to find out locations where apartments are available. A user can input information about a particular apartment after having toured the apartment, while the user is located at the geographic location of the apartment. The device will identify where the user's device is located and provide the geographic position and information being input to the database. In other words, based on the location of the device, the information input by the user is uploaded to the database and associated with that particular landmark at that location.

The system can also provide a place for homeowners to advertise their home "for sale by owner." The system can also be a tool for realtors. For example, a realtor can place an advertisement such as, This property is not for sale, but I can find you one just like it. I've sold 30 homes in this neighborhood. Call Stan the real estate man at 555-555-5555. The advertisement can be viewed on a user's wireless device as they walk or drive past a certain property.

The system can also be used together with other services such as partnering with a yellow pages provider or other Internet website owners. For example, a yard sale finder could be included and used together with the classified section of the local newspaper. Data could be provided automatically from the local newspaper to the system on a prearranged update basis, for example daily, weekly or within some other desired time interval, to capture new classified advertisements placed in the newspaper. Thus, a user can log onto the system from their cell phone or other wireless device to locate a yard sale near where the user is physically located. Directions to the yard sale can also be provided. Information about that yard sale, such as items for sale, prices, etc. can be provided. For example, a user can go to a yard sale and input a "review" of the yard sale such as, "This yard sale has tons of great CD's." That information, which is input while the user is at the yard sale, is uploaded based on the geographic position of the user. Accordingly, the information/review is associated with that particular location, When a subsequent user retrieves the classified ad about the yard sale, the user can also be provided with the review of the yard sale. The review/additional information can either be provided automatically or selectively based on user preference. For example, a user may be given the option of retrieving reviews. The scenario described above can also be associated with a restaurant, retail outlet, museum, house, etc.

The system allows businesses, individuals, cultural organizations, and other users to enter data directly into the system through a designated Internet website or by telephone. For example, a user of a wireless device can input data associated with a property or landmark into the device and the information can be uploaded to a database. This information can made available to other users through the system. The system also provides for users to input data from other locations, such as from a home computer, an office etc. The system can automatically geocode the location associated with the information input by the user and provide the information to other users.

With the system, a user of a wireless device, such as a cell-phone or personal data assistant (PDA), can receive information from a database automatically as they, for example, they walk past a particular landmark or property. A user can also request information from the database just as they would a game from their wireless carrier. A user can also perform searches on the database.

FIG. 1 is a schematic illustration of a system according to an embodiment of the invention. The system 10 includes a device 20 having a transmitter 22 and a receiver 24, and an information database 26. The device 20 can be, for example, a wireless and/or mobile electronic device such as a mobile telephone or a PDA or alternatively the device 20 can be a non-mobile or non-wireless device such as a personal computer. The device 20 can be in communication with the information database 26 through a network such as the Internet.

The device 20 can also be in communication and operable with a GPS satellite 28 via the receiver 24. Alternatively. the device 20 can include other location technology such as tri-angulation or WiMAX. The receiver 24 can include, for example, a wide area augmentation system (WAAS) digital global positioning system (DGPS).

The database 26 can be accessible by a user 34 of a device 20 and multiple other users (e.g., users of devices 120 and 220 illustrated in FIG. 1). The database 26 can also be accessed by non-mobile devices, such as a personal computer, to, for example, upload information into the database. Although three devices 20, 120 and 220 are illustrated in FIG. 1, any number of devices 20 can be in communication with the database 26 through a network. Thus, multiple users can access information stored within the database 26, and input data into the database 26.

The database 26 includes a processor 30. The processor 30 can be, for example, a commercially available personal computer, or a less complex computing or processing device that is dedicated to performing one or more specific tasks. For example, the processor 30 can be a terminal dedicated to providing an interactive graphical user interface (GUI). The processor 30, according to one or more embodiments of the invention, can be a commercially available microprocessor. Alternatively, the processor 30 can be an application-specific integrated circuit (ASIC) or a combination of ASICs, which are designed to achieve one or more specific functions, or enable one or more specific devices or applications. In yet another embodiment, the processor 30 can be an analog or digital circuit, or a combination of multiple circuits.

The processor 30 can include a memory component 32. The memory component 32 can include one or more types of memory. For example, the memory component 32 can include a read only memory (ROM) component and a random access memory (RAM) component. The memory component 32 can also include other types of memory that are suitable for storing data in a form retrievable by the processor 30. For example, electronically programmable read only memory (EPROM), erasable electronically programmable read only memory (EEPROM), flash memory, as well as other suitable forms of memory can be included within the memory component 32. The processor 30 can also include a variety of other components, such as for example, co-processors, graphic processors, etc., depending upon the desired functionality of the code.

The processor 30 is in communication with the memory component 32, and can store data in the memory component 32 or retrieve data previously stored in the memory component 32. The components of the processor 30 can communicate with devices external to the processor 30 by way of an input/output (I/O) component (not shown). According to one or more embodiments of the invention, the I/O component can include a variety of suitable communication interfaces. For example, the I/O component can include, for example, wired connections, such as standard serial ports, parallel ports, universal serial bus (USB) ports, S-video ports, local area network (LAN) ports, small computer system interface (SCCI) ports, and so forth. Additionally, the I/O component can include, for example, wireless connections, such as infrared ports, optical ports, Bluetooth® wireless ports, wireless LAN ports, or the like. The network to which the processor 30 is connected can be physically implemented on a wireless or wired network, on leased or dedicated lines, including a virtual private network (VPN).

The device 20 also includes a processor (not shown in FIG. 1) as described above for the database. The processor can include a computer-readable medium storing code to execute the functions described herein. The device 20 also includes a display (not shown in FIG. 1) configured to display data received at the device 20 and provide user interaction. The display can be, for example, a touch-screen. The device 20 can also include an input device, such as a stylus, or a keypad portion for entering data.

Figure 2:
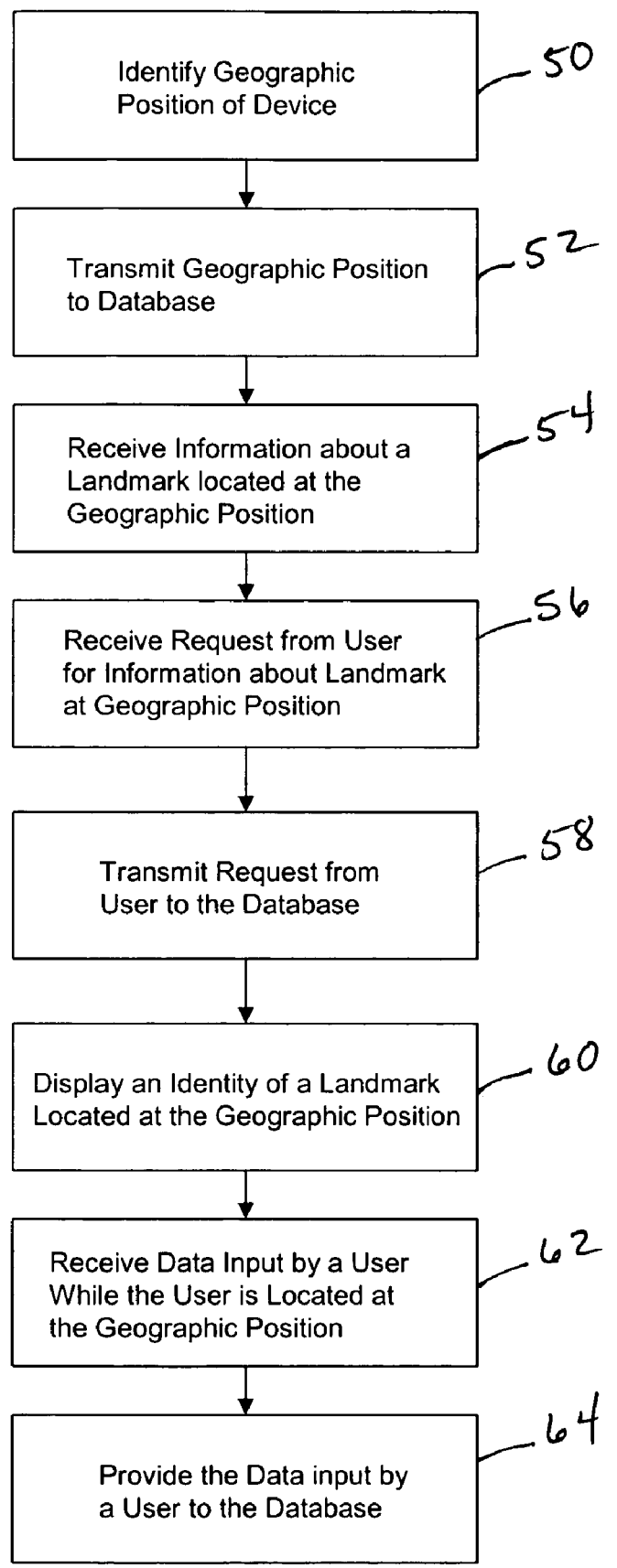
FIG. 2 is a flowchart illustrating a method according to an embodiment of the invention.

A method of use of a system 10 is illustrated in the flowchart of FIG. 2. At step 50 a geographic position of a wireless device 20 operated by a user 34 is identified. As described above, this identification can include communication with a GPS satellite to identify longitude and latitude coordinates for the geographic position of the device 20. The geographic position can then be transmitted to a database 26 at step 52. At step 54, data associated with one or more landmarks at the geographic position is received at the device 20 from the database 26. The data can be automatically transmitted from the database 26 to the device 20 based on the geographic position of the device 20. For example, when the device 20 (operated by a user) is located at a geographic position, such as when the user is standing by a landmark at the geographic position, data associated with the landmark can be automatically sent to the device 20. A user can also request information about a landmark at the geographic position for which the user is located by inputting a request into the device 20 at step 56. The device 20 can receive the request and transmit it to the database at step 58. Where there are multiple landmarks at a given geographic position, the device 20 can display an identity for each landmark and provide information about all of the landmarks at step 60. The user can select one of the landmarks when making a request. For example, a list of identities for multiple landmarks can be automatically transmitted to the device 20 from the database 26, and the user can select one of the landmarks to obtain further information about the landmark.

At step 62 the user can input data into the device via a user interface (e.g., keypad, stylus, touch-screen), and at step 64 the device 20 can transmit the data to the database 26. This allows information about a landmark to be loaded into the database in real-time and made available to other users of the database 26 as described above.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents. While the invention has been particularly shown and described with reference to specific embodiments thereof, it will be understood that various changes in form and details may be made.

What is claimed is:

1. A method, comprising:
    identifying a geographic position of a wireless device;
    receiving data input by a user while the user is located at the geographic position of the wireless device, the data being associated with a landmark at the geographic position;
    providing the data to a database based on the geographic position; and
    based on the identifying, automatically receiving location-centric information associated with the landmark from the database while the user is located at the geographic position.

2. The method of claim 1, wherein the identifying a geographic position includes identifying latitude and longitude coordinates associated with the landmark.

3. The method of claim 1, wherein the data is associated with a sale of the landmark.

4. The method of claim 1, wherein the data is associated with an advertisement associated with the landmark.

5. The method of claim 1, wherein the data includes a review associated with the landmark.

6. The method of claim 1, further comprising:
    receiving a request from the user for information associated with the landmark; and
    transmitting the request to the database.

7. The method of claim 1, wherein the landmark is a first landmark from a plurality of landmarks, the method further comprising:
    displaying an identity for a plurality of landmarks located at the geographic position.

8. A processor-readable medium storing code representing instructions to cause a processor to perform a process, the code comprising code to:
    identify a geographic position of a wireless device;
    receive data input by a user while the user is at the geographic position of the wireless device, the data being associated with a landmark at the geographic position;
    provide the data to a database based on the geographic position; and
    based on the identified geographic position, automatically receive information associated with the landmark from the database when the wireless device is located at the geographic position.

9. The processor-readable medium of claim 8, wherein the identify a geographic position includes identify a latitude and a longitude coordinate associated with the landmark.

10. The processor-readable medium of claim 8, wherein the data is associated with a sale associated with the landmark.

11. The processor-readable medium of claim 8, wherein the data is associated with an advertisement associated with the landmark.

12. The processor-readable medium of claim 8, wherein the data includes a review associated with the landmark.

13. The processor-readable medium of claim 8, further comprising code to:
    receive a request from the user for information associated with the landmark; and
    transmit the request to the database.

14. The processor-readable medium of claim 8, wherein the landmark is a first landmark from a plurality of landmarks, the processor-readable medium further comprising code to:
    display an identity for a plurality of landmarks located at the geographic position.

15. A wireless device, comprising:
    a transmitter configured to transmit a geographic position of the wireless device to a database; and
    a receiver configured to receive data input by a user of the wireless device while the user is located at the geographic position of the wireless device, the data associated with a landmark at the geographic position of the wireless device, the receiver configured to automatically receive information associated with the landmark from the database when the receiver is located at the geographic position.

16. The wireless device of claim 15, further comprising:
    a display configured to display the received information associated with the landmark, and
    an input device.

17. A system, comprising:

an information database including location-centric information; and a wireless device configured to provide a geographic position of the wireless device to the database and to automatically receive from the database location-centric information associated with a landmark at the geographic position when the wireless device is located at the geographic location, the wireless device configured to receive data associated with the landmark that is input by a user of the wireless device while the user is located at the geographic position, the wireless device configured to transmit the data to the database, the information database configured to automatically associate the data with the geographic position substantially simultaneously with the transmitted data being uploaded to the database.

18. The system of claim 17, wherein the landmark is a first landmark from a plurality of landmarks, the wireless device is configured to display information associated with the first landmark from the plurality of landmarks based on an input by the user.

19. A method, comprising:

receiving an indication of a geographic position associated with a location of a wireless device;

receiving data input by a user of the wireless device while the user is located at the geographic position, the data associated with at least one landmark at the geographic position; and after the receiving an indication of a geographic position, automatically transmitting location-centric information associated with the at least one landmark to the wireless device when the wireless device is located at the geographic position.

20. The method of claim 19, further comprising:

receiving a request from the wireless device, the request associated with a landmark from the at least one landmarks at the geographic location.

21. The method of claim 19, wherein the data input by a user includes a review associated with a landmark from the at least one landmarks.

22. The method of claim 19, wherein the data input by a user is automatically associated with the geographic position substantially simultaneously with the data being input by the user.

* * * * *

UNITED STATES PATENT AND TRADEMARK OFFICE
CERTIFICATE OF CORRECTION

PATENT NO. : 7,599,795 B1 Page 1 of 1
APPLICATION NO. : 11/249733
DATED : October 6, 2009
INVENTOR(S) : Brad W. Blumberg et al.

It is certified that error appears in the above-identified patent and that said Letters Patent is hereby corrected as shown below:

Title Page, Item 63
*In the Related U.S. Application Data on the cover sheet of the patent, please replace the paragraph with the following paragraph:*

Continuation-in-part of application No. 09/639,265, filed on Aug. 15, 2000, now Pat. No. 6,385,541, application No. 11/249,733 is also a continuation-in-part of application No. 10/644,060, filed August 20, 2003, now Pat. No. 7,457,628, which is a continuation-in-part of application No. 09/774,119, filed on Jan. 31, 2001, now Pat. No. 7,072,665, which is a continuation-in-part of application No. 09/639,265, filed on Aug. 15, 2000, now Pat. No. 6,385,541, application No. 11/249,733 is also a continuation-in-part of application No. 09/774,119, filed on Jan. 31, 2001, now Pat. No. 7,072,665.

*In the Cross-Reference To Related Applications section of the written description, Column 1, line 19, change:*

"10/644,040" to --10/644,060--.

*In the Cross-Reference To Related Applications section of the written description, Column 1, line 22, change:*

"6,950,326" to --7,457,628--.

Signed and Sealed this

Seventh Day of September, 2010

David J. Kappos
*Director of the United States Patent and Trademark Office*